Patented Feb. 11, 1936

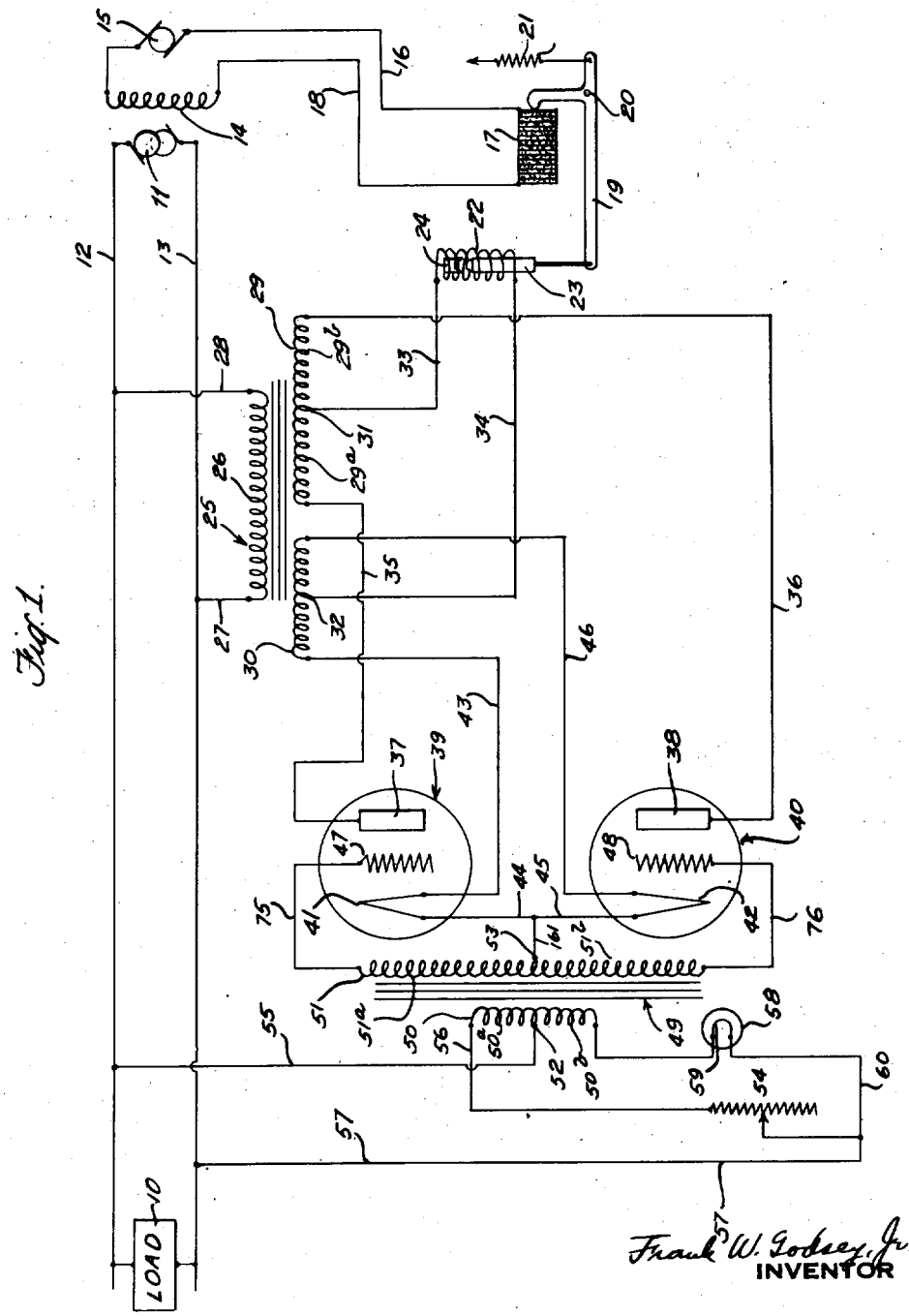

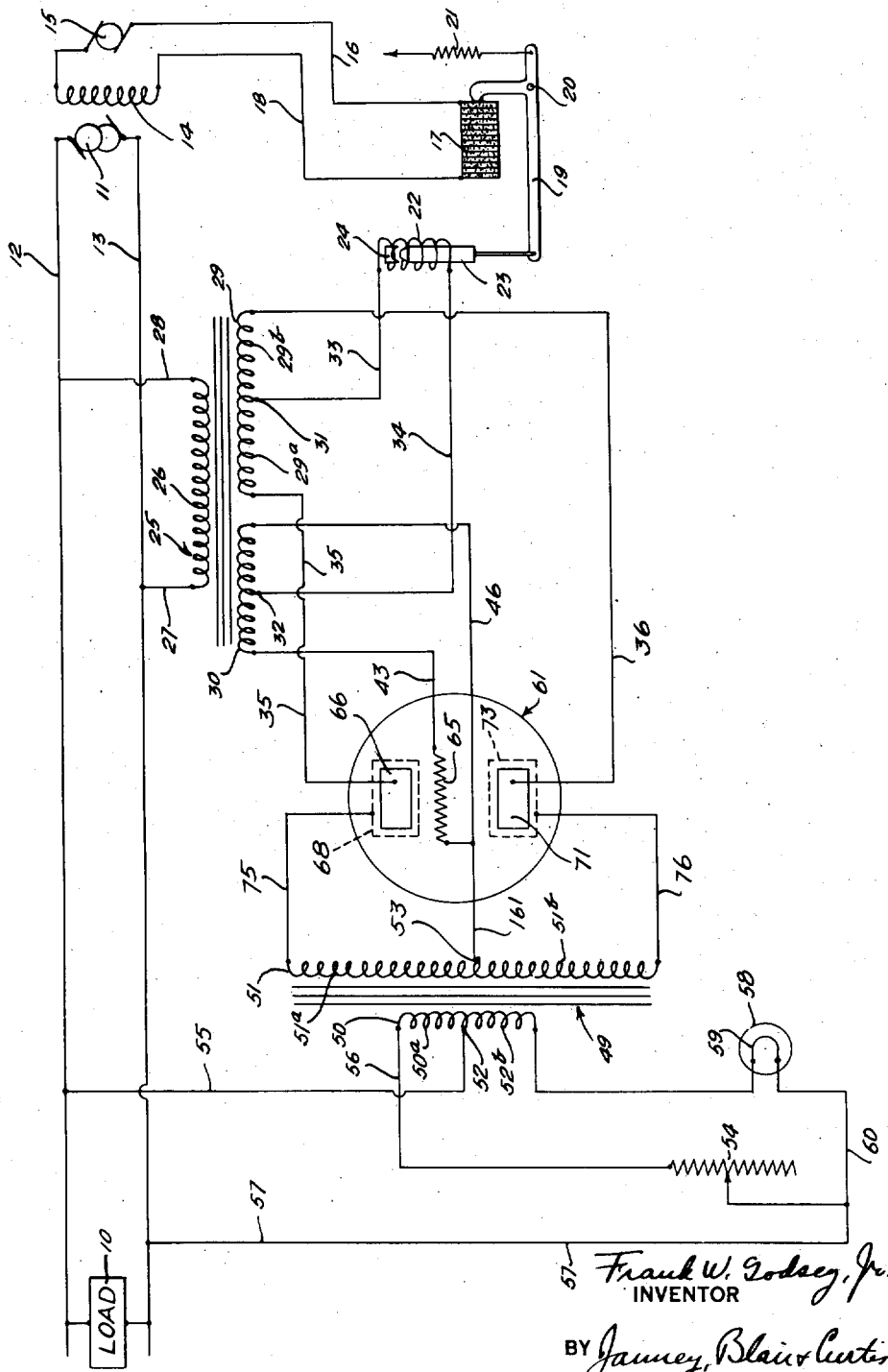

2,030,202

UNITED STATES PATENT OFFICE 2,030,202

APPARATUS FOR ELECTRICAL CONTROL

Frank W. Godsey, Jr., New Haven, Conn., assignor to The Safety Car Heating & Lighting Company, a corporation of New Jersey Application December 4, 1931, Serial No. 578,946

8 Claims. (Cl. 171—119)

This invention relates to electric regulation and more particularly to a system and apparatus for the regulation of alternating current circuits.

One of the objects of this invention is to provide a system and apparatus for electric control which is simple, practical and thoroughly dependable. Another object of this invention is to provide a system and apparatus of the above mentioned character which is highly sensitive to changes in characteristics of the circuit to which it is to be connected. Another object of this invention is to provide a system and apparatus of the above mentioned character in which the number of moving parts has been reduced to a minimum. Another object of this invention is to provide a thoroughly practical electric control system and apparatus which is inexpensive in construction, efficient in operation and one requiring a minimum amount of attention. Another object of this invention is to provide a system and apparatus of the above mentioned character which may be readily and effectively set to meet the many variable conditions of actual use. Another object of this invention is to provide a rectifying device which is inexpensive in construction and dependable and efficient in operation.

Other objects will be in part obvious or in part pointed out hereinafter.

The invention accordingly consists in the features of construction, combinations of elements, and arrangements of parts, all as will be exemplified in the structure to be hereinafter described, and the scope of the application of which will be indicated in the following claims.

In the accompanying drawings, in which is shown one of the various possible embodiments of my invention, Figure 1 is a diagrammatic showing of a control system and apparatus for a compressible carbon pile resistor.

Figure 2 is a diagrammatic representation similar to that of Figure 1 but employing a different form of electronic conduction means.

Similar reference characters refer to similar parts throughout the several views of the drawings.

Referring first to Figure 1, there is shown an alternating current supply circuit including a load 10 supplied with energy from an alternator 11 over the main line conductors 12—13. Alternator 11 may be of any suitable form or construction and may, for example, be of the usual 60-cycle type employed in power circuits. It is provided with a field winding 14 which is supplied with excitation current from a suitable direct current source such as a generator 15 but through a circuit which includes conductor 16, a compressible carbon pile variable resistance 17, and conductor 18 so that the excitation current supplied to the field winding 14 may be varied.

By way of illustration, let it be assumed that the alternating potential across conductors 12—13 and hence across the load 10 is to be maintained substantially constant as against variations that might be caused, for example, by the changes in the load 10 or any other factor. The carbon pile 17 therefore is to be made responsive to changes in the alternating potential which is to be maintained constant.

One of the dominant aims of this invention is to provide a thoroughly practical, inexpensive, and reliable system and apparatus in which the manifold advantages of a compressible carbon resistance may be reliably achieved without detrimentally affecting the control of the carbon pile by reason of the fact that the latter is to be responsive to changes in the function of the energy put out by an alternating current source. In this connection, and as conducive to a clearer understanding of certain features of the invention, it might be pointed out that, in the simplest form of control for a carbon pile, an electromagnet or a solenoid with a plunger type of movable core has manifold advantages but that, if such an electromagnet or solenoid is employed in an alternating current circuit, dependable regulation cannot be achieved because every change that is brought about in the magnetic circuit of these parts causes a change in the impedance of the electromagnet or solenoid winding to the alternating current energizing it; as a result of such change in impedance, changes in the current upon which reliance is placed for achieving regulation are affected so that such an arrangement cannot be dependably employed for obtaining regulation in an alternating current circuit. In accordance with certain features of my invention, however, I am enabled to do away with such disadvantages and to achieve the manifold advantages of a carbon pile regulator in an alternating current circuit.

Referring again to Figure 1 of the drawings, the carbon pile 17 has its one end, illustratively its left-hand end, anchored against movement while its other or right-hand end is engaged by one arm of a bell-crank lever 19 pivoted at 20. A spring 21 acts upon lever 19 in a direction to cause compression of the pile 17 and the action of spring 21 is opposed by a solenoid having a winding 22 within which is the movable core 23 connected to the lever 19.

Preferably the solenoid 22—23 is constructed in any suitable way so that, for a given direct current energization of the winding 22, the core 23 will be held in any position into which it is moved, within its range of movement. For this purpose, the upper end of core 23 may be tapered and may coact with a similarly tapered fixed core member 24 of suitable magnetic material, all as is indicated in Figure 1 of the drawings.

Considering now the energization and control of winding 22, it is first to be noted that I provide a transformer 25 whose primary winding 26 is connected across the alternating current circuit 12—13 by conductors 27—28; this transformer 25 is provided with two secondary windings 29 and 30 having taps 31 and 32 respectively at their centers. Conductors 33 and 34 connect the winding 22 to midpoint or centers taps 31 and 32.

The end terminals of the secondary winding 29 are connected by conductors 35 and 36 to the plate anodes 37 and 38 respectively of unilaterally conductive electronic conduction devices 39 and 40 respectively.

In so far as certain features of my invention are concerned, the devices 39 and 40 may be of any suitable construction and action; for example, they may be of thermionic type and hence may have cathodes 41 and 42 respectively and preferably in a form of filaments adapted to be heated from a suitable source of current. The electrodes of these devices may be mounted and supported in any suitable manner within an evacuated vessel.

Conveniently I supply heating current to the filament cathodes 41—42 from the alternating current line 12—13 and in order to supply such heating current thereto at a suitably low voltage, I suitably proportion the number of turns on the secondary winding 30 of the transformer 25 and connect the filament cathodes thereto. The latter may conveniently be connected serially and the heating circuit will be seen to extend from one terminal of winding 30, conductor 43, cathode 41, conductor 44, conductor 45, cathode 42, and thence by way of conductor 46 back to the remaining terminal of the winding 30. Thus the cathodes 41 and 42 are suitably heated to achieve thermionic emission and thus to achieve conduction across the space between the cathodes and the plate anodes, this space being thus also unidirectionally conducted.

The termionic devices 39—40 coact to insure the supply to the solenoid winding 22 of unidirectional current and rectify both half-waves of the alternating current derived from the main line conductors 12—13. The unidirectional energization of winding 22 may best be understood if the actions that take place during two successive half cycles are considered.

For example, during one half-wave of the alternating potential effective in transformer primary winding 26, there is made effective a potential in the secondary winding 29 acting, let it be assumed, in a direction from the left to the right as viewed in Figure 1. That portion of this potential that is effective in the one half 29ª of the winding 29 is effective to cause a current to flow in the following circuit:—From the right-hand terminal 31 of the half winding 29ª, conductor 33, solenoid winding 22, conductor 34, midpoint 32 of the secondary winding 30, conductors 43 and 46, cathode 41, plate anode 37, and thence by way of conductor 35 back to the remaining or left-hand terminal of the half winding 29ª. During this half cycle, the potential effective in the half winding 29ᵇ is prevented from energizing the solenoid winding 22 because the circuit in which that half winding 29ᵇ is effective prevents the flow of current in the direction of the potential effective during this half cycle.

During the next half cycle, the potential effective in winding 29 is reversed and now acts, let it be assumed, in a direction from the right to the left. Now the potential effective in the half winding 29ᵇ sends a current through the solenoid winding 22, through the following circuit:—From the left-hand terminal 31 of the half winding 29ᵇ, conductor 33, solenoid winding 22, conductor 34, midpoint 32 of the transformer winding 30, conductors 43 and 46, cathode 42, plate anode 38, and thence by way of conductor 36 back to the remaining or right-hand terminal of the half winding 29ᵇ. It is to be noted that the direction of current flow through the solenoid winding 22 during this half cycle is the same as was the case during the preceding half cycle.

These actions are repeated during successive cycles and thus winding 22 is supplied with unidirectional current and, even though the core 23 may change its position with respect to the fixed core 24, such change does not affect the resistance to current flow through the winding 22 as would be the case if the latter were energized by alternating current.

The various parts thus far described are so proportioned and constructed that core 23 is in equilibrium with the spring 21 so long as the desired alternating potential exists across conductors 12—13.

The electronic conduction devices 39 and 40 are preferably provided with suitable control elements which preferably and conveniently take the form of grids 47 and 48 respectively suitably positioned so that any change in potential of the grids affects the conductivity of the devices themselves. Grids 47 and 48 are arranged to be responsive to departures from the intended or desired value of the alternating potential across the main line 12—13, and, considering a preferred arrangement for achieving a rapid and multiplying response of the grids to changes in the potential across conductors 12—13, it will first be noted that I provide a transformer generally indicated at 49 provided with a primary winding 50 and a secondary winding 51, each having a tap at its midpoint, as at the points 52 and 53, thus dividing the winding 50 into two sections 50ª and 50ᵇ and dividing winding 51 into two sections 51ª and 51ᵇ. The ratio of transformation of the transformer 49 is high; the primary winding 50 has a relatively small number of turns, while the secondary winding 51 has a relatively large number of turns.

The section 50ª of winding 50 is connected across the main line 12—13 through a variable resistance 54 preferably manually adjustable in any suitable way; the circuit will be seen to extend from conductor 12, conductor 55, midpoint 52 of winding 50, section 50ª of the winding, conductor 56, variable resistance 54, and then by way of conductor 57 back to the other main line conductor 13.

The remaining section 50ᵇ of winding 50 is connected through a ballast tube 58 across conductors 12—13. Ballast tube 58 may conveniently comprise an iron wire 59 enclosed in a suitable vessel filled with hydrogen at relatively low pressure and is thus given the characteristic of maintaining therethrough substantial constancy of current flow throughout a suitable operating range of change of applied voltage.

The circuit of the section 50ᵇ of the winding 50 extends from conductor 12, conductor 55, midpoint 52, section 50ᵇ of the winding 50, ballast tube 58, conductor 60, and then by way of conductor 57 to main line conductor 13.

The potential of the grids 47 and 48 is appropriately related to the cathodes 41 and 42 respectively by a conductor 61 which connects the midpoint 53 of the winding 51 to the junction of conductors 44—45 which lead to the cathodes.

When normal or desired potential exists across the load 10 and hence across the conductors 12—13, the potential of grids 47 and 48 is zero, and solenoid winding 22 is energized by a unidirectional current achieved by the coaction of the transformer winding 29 and the rectifying devices 39—40 which function as was described above, core 23 of the solenoid being held in whatever position it happens to be under the existing conditions. The voltage applied to the control grids 47—48 is zero because, under the assumed normal conditions in the circuit 12—13, the effective ampere-turns of winding 50 is zero so that no potential is induced in the winding section 51ᵃ that affects grid 47 and a similar condition exists in winding section 51ᵇ which affects the grid 48. The current in the sections 50ᵃ and 50ᵇ of the primary winding 50 flow in opposite directions and are equal so long as the intended potential exists across the load 10; this equality, for the voltage desired to be maintained across the load 10, is achieved by suitably adjusting the variable resistance 54, its range of change in its related circuit being commensurate with the range of action throughout which the ballast tube 58 functions as above described.

Let it be assumed, however, that conditions arise such as cause the potential across the load 10 to increase above the desired value. That increase in potential will make itself felt in the sections of secondary winding 29 and causes an increased current flow in the circuit of solenoid winding 22. But accompanying that action is an action of a high amplifying character affecting the grids 47 and 48 and also the current flowing through the solenoid winding 22.

The assumed increase in the potential causes an increased current flow in the circuit of winding section 50ᵃ of transformer 49 but the action of the iron wire resistance 59 in the ballast tube 58 prevents a like increase in the current flowing through the winding section 50ᵇ. There results therefore a net magnetomotive force which is determined by the difference between the thus increased ampere-turns effective in winding section 50ᵃ and the substantially unchanged number of ampere-turns effective in the winding section 50ᵇ.

The effective or net voltage thus acting in winding 50 of the transformer 49 is greatly stepped up by the transformer 49 and there is thus made available a relatively high potential applied to the grids 47 and 48. The various parts are so connected that the phase relations in the circuits are such that this relatively high voltage thus applied to the grids 47 and 48 is in a direction to increase the conductivity of the conduction devices 39 and 40 so that the current flowing through the solenoid winding 22 is quickly and rapidly increased and is in fact increased at a rate greatly in excess of the rate of increase of the potential across the conductors 12—13 above normal.

Winding 22 therefore disturbs the state of equilibrium theretofore existing between its pull and the pull of spring 21 and solenoid core or plunger 23 is raised to increase the resistance of carbon pile 17 and thus to diminish the excitation of alternator 11 sufficiently to cause its potential as applied to the load 10 to be restored to normal, whence equilibrium between the solenoid pull and the pull of the spring 21 is restored and the new value of resistance of carbon pile 17 maintained. At the same time the quality of current flow through winding sections 50ᵃ and 50ᵇ is restored and the potential applied to grids 47 and 48 restored to zero.

Should such changes occur as cause the potential across the load 10 to be reduced below normal, a reverse action takes place and this time the current through winding section 50ᵃ diminishes while, due to the manner in which the resistance of the iron wire 59 changes with change in temperature, the current in winding section 50ᵇ remains substantially unchanged or constant. A net potential is now effective in winding 50 but it acts in reversed direction from that in which the net voltage acted when the line voltage increased above normal. This net potential is greatly stepped up by the transformer 49 and is applied to the grids 47 and 48, but, because of the reversal of the net voltage effective in the primary winding 50, the stepped up potential applied to grids 47 and 48 is reversed in phase with respect to the potential applied to the plate anodes 37—38 and thus brings about a rapid and great decrease in the conductivity of the conduction devices 39—40 which in turn quickly diminishes the energization of solenoid winding 22.

Spring 21 now becomes preponderant over the pull of solenoid winding 22 over core 23, and carbon pile 17 is quickly compressed to increase the excitation of alternator 11 and restore the potential to normal again.

When normal potential is thus restored the net voltage acting in winding 50 is again zero, the potential acting on grids 47 and 48 is again zero, and the energization of winding 22 again becomes normal so that its pull balances the pull of spring 21 and core 23 is held into the position in which it has been moved.

Turning now to Figure 2 of the drawings, I have there shown an illustrated embodiment of a preferred form of device which I may employ in the circuit of Figure 1 in place of the two electronic devices 39 and 40. I provide a suitable envelope or container 61 which may be of glass and through which suitable conductors are sealed and which supports certain electrodes.

The envelope 61 has suitably supported therein a cathode 65 of any suitable material adapted, upon being suitably heated by a suitable current supplied thereto by the conductors 43 and 46, to emit electrons. The cathode 65 is preferably of the oxide-coated filament type. On the two sides of the cathode 65 are mounted two similar units.

One of these units comprises an anode 66 made of a suitable material such as metal and it may be surrounded or encased by a grid-like electrode 68. The other unit comprises an anode 71 to which is related, preferably by encasing it, a grid-like electrode 73. Electrodes 68 and 73 may be made of wire mesh.

The vessel 61 after being first exhausted and the electrodes therein heated so as to remove as thoroughly as possible undesired or occluded gases is then filled with a suitable quantity of mercury vapor, as is later described.

Conductors 43 and 46 lead to the filament-heating winding 30 of the transformer 25. Conductors 35 and 36 lead from the transformer secondary winding 29 to the anodes 66 and 71 of the device 61. Conductors 75 and 76 lead from the secondary winding 51 of transformer 49 to the control electrodes 68 and 73.

With the above-described device 61 embodied in the arrangement as shown in Figure 2, vast improvements and many advantages over those of the arrangement of Figure 1 are achieved. The characteristics of the thermionic devices employed in Figure 1, while adapted admirably to achieve the advantages and unique as described in connection with Figure 1, nevertheless have certain limitations which impose upon the rest of the apparatus and system certain factors which I am enabled to greatly alleviate with the system of Figure 2. For example, the current carrying capacity of the thermionic devices of Figure 1 is limited and it is necessary to have relatively high voltages in the circuit of the plate anodes 37 and 38 (see Figure 1) and also a relatively large number of turns in the solenoid winding 22 in order that adequate ampere-turns are available in the latter dependably to control the action of the compressible resistance 17.

By including in the devices of Figure 2 a medium, illustratively mercury vapor, the molecules of which can be and are broken down by electronic bombardment or by ionizing collisions or otherwise, the current carrying capacity is greatly increased, and I am enabled to operate at the same voltage in the plate circuits but with a greater current available to the solenoid winding 22, thus permitting the use of fewer turns or a lower resistance in the latter, or to operate at a lower plate voltage and still obtain a greater current in the circuit of the solenoid winding 22.

Furthermore, the control of the conductivity of the space between the cathode 65 and either anode 66 or 71, and which conductivity is a function not only of the electronic emission from the cathode 65 but also of the conduction of the medium filling that space, is varied in far greater proportion with respect to a given change in potential impressed upon the control electrodes 68 and 73 than is the case with the thermionic devices of Figure 1.

Accordingly, for the same change in potential that is impressed upon the control grids 47 and 48 of Figure 1, I am enabled with the arrangement of Figure 2, when that change in potential is impressed upon the control anodes 68 and 73, to cause a far greater change in the current flowing through the solenoid winding 22. This advantage and action is reflected in the performance and functioning of the transformer 49 and its control. For example, a relatively minute unbalance between the winding sections 50ª and 50ᵇ can now be made more speedily and in greater magnitude to bring about a corrective action by the carbon pile 17 than is true of the arrangement of Figure 1.

Where the device 61 contains mercury vapor, the latter may be introduced into the vessel in any suitable way. For example, the vessel may first be exhausted and the several drops of liquid mercury introduced; the vessel is then heated to vaporize the mercury and then some of the mercury vapor thus produced is allowed to escape in order to sweep out any gases that might have been left in the vessel. The vessel or glass tube is then sealed off, the mercury vapor remaining in the vessel at a vapor pressure which depends upon the temperature to which the device is subjected in use. The actual mercury vapor pressure will be that of saturated mercury vapor at the temperature of operation of the device.

I may, however, also employ a suitable gas instead of mercury vapor, for example, helium or neon. Such a gas when employed is introduced into the vessel at a pressure on the order of around 10 or 20 millimeters of mercury. Such advantages in the operation of the system as have already been pointed out above may be also achieved where the device is gas filled instead of filled with mercury vapor.

As illustrative of certain other advantages that I may thus achieve, it might be pointed out that with the pure thermionic devices such as are illustratively described in connection with Figure 1, a relatively high voltage is necessary to overcome the electronic space charge that exists in devices of this character; the voltage necessary to do this is on the order of 100 volts or more. But the mercury vapor or the gas makes available in the space within the vessel positive ions (either of the mercury or gas molecules) that penetrate the negative space charge (which otherwise repels electrons emanating from the filament cathode) and neutralizes or breaks down that negative space charge, allowing a much more rapid transfer of electrons from the filament cathode to the positive anode or anodes of the devices. This action makes it unnecessary to have to employ such high voltages as 100 volts or more and thus a high conductivity is achieved at very low voltage. In fact, a high conductivity may be achieved at voltages as low as 10 or 20 volts.

Thus I am enabled to vastly improve the action and results that typify the arrangement of Figure 1, I am enabled to employ smaller and hence less expensive and more compact apparatus and equipment, and I am enabled to achieve highly accurate and efficient and sensitive regulation. With the exceptions above pointed out, the operation of the system of Figure 2 will be readily understood, it is believed, in view of what has been set forth above in connection with the description of the cyclic action that takes place and when departures from intended voltage across the load 10 take place.

It will thus be seen that there has been provided in this invention a system and apparatus in which the various objects hereinbefore noted, together with many thoroughly practical advantages, are successfully achieved.

As many possible embodiments may be made of the mechanical features of the above invention and as the art hereindescribed might be varied in various parts, all without departing from the scope of the invention, it is to be understood that all matter hereinabove set forth or shown in the accompanying drawings is to be interpreted as illustrative and not in a limiting nature.

I claim:

1. In apparatus of the character described, in combination, a source of alternating current, a circuit control coil, a balanced rectifier comprising electronic conduction tubes in opposed relation, each tube having anode, cathode and control electrodes, means including a transformer having two opposed windings for energizing said control electrodes from said source, and means interposed between each of said windings and said source for rendering them differentially effective upon a change in the function of said source.

2. In apparatus of the character described, in combination, a source of alternating current, a circuit control coil, a balanced rectifier comprising electrionic conduction tubes in opposed relation, each having anode, cathode and control electrodes, means including coacting windings for energizing said control electrodes from said source, and means including a resistance and a ballast tube interposed between said windings, respectively, and said source for rendering effective one of said windings to a greater extent than the other in response to a change in a function of said source.

3. In apparatus of the character described, in combination, a source of alternating current, a circuit control coil, a balanced rectifier comprising electronic conduction tubes in opposed relation, each having anode, cathode and control electrodes, means for energizing said anode and cathode electrodes from said source, a transformer having a secondary winding connected in balanced relation to said control electrode of said rectifier, said transformer having a primary winding having its terminals connected to the same side of said source and having an intermediate point thereof connected to the other side of said source, whereby, when the intended value of a function of said source exists, said primary winding is of substantially negligible effect, and means responsive to a departure from the intended value of said function for causing the sections of said primary winding to act dissimilar.

4. In apparatus of the character described, in combination, a source of alternating current, a circuit including a resistance, means including a control coil for varying said resistance, means including a rectifier for operating said coil, and means including transformer means, portions of which are in opposed relation and respectively have a resistance and ballast tube interposed between them and said source for differentially acting upon said rectifier upon a change in a function of said source.

5. In a regulating system, in combination, a source of alternating current, a variable resistance comprising a pressure-responsive carbon pile for controlling a function of the output of said source, said carbon pile having the inherent characteristic of requiring the exertion of substantial force to achieve variation in its resistance, electromagnetic means capable of sufficient current energization to effect variation in the pressure on said pile for controlling said carbon pile, and means for supplying said electromagnetic means with sufficient uni-directional current obtained from said source for effecting pressure variation and including spaced electrodes, one of which is thermionic, functioning in a medium the conductivity of which supplements the conductivity caused by the electron emission from said thermionic electrodes, for effecting energization of said electromagnetic means from said source, and a step up transformer having opposed primary windings and means rendering said windings differentially responsive to changes in said function for affecting the conductivity of the space between said electrodes.

6. In a regulating system, in combination, a source of alternating current, a carbon pile for controlling a function of the output of said source, electromagnetic means for controlling said carbon pile, a uni-directionally conductive electronic conduction device interposed between said source and said electromagnetic means for energizing the latter with uni-directional current derived from said source, said device having a control electrode, said electromagnetic means being energized by a critical value of current corresponding to the desired function of the output of said source that is to be maintained constant when the potential on said control electrode is substantially zero, means for causing said control electrode to respond to changes in the said function and including a transformer whose secondary winding is connected to said control electrode and primary windings in opposed relation and connected to be energized from said source, and means in circuit with at least one of said primary windings for causing its response to a change in said function to be different from the response caused by said change in the other of said primary windings.

7. In a regulating system, in combination, a source of alternating current, a carbon pile for controlling a function of the output of said source, electromagnetic means for controlling said carbon pile, a uni-directionally conductive electronic conduction device interposed between said source and said electromagnetic means for energizing the latter with uni-directional current derived from said source, said device having a control electrode, said electromagnetic means being energized by a critical value of current corresponding to the desired function of the output of said source that is to be maintained constant when the potential on said control electrode is substantially zero, means for causing said control electrode to respond to changes in the said function and including a transformer whose secondary winding is connected to said control electrode, and a primary winding having its terminals connected to the same side of said source and an intermediate point therein connected to the other side of said source, and means causing one section of said primary winding to respond to a change in said function differently from the response of the other section of said primary winding.

8. In a regulating system, in combination, a source of alternating current, a carbon pile for controlling a function of the output of said source, said carbon pile having the inherent characteristic of requiring the exertion of substantial force to vary the pressure thereon for achieving variation in resistance thereof, electromagnetic means of sufficient power, if energized with uni-directional current, for controlling said carbon pile a uni-directionally conductive electronic conduction device having a medium therein capable of cumulative ionization, said device being interposed between said source and said electromagnetic means for energizing the latter with sufficient uni-directional current derived from said source to control the pressure on said carbon pile, said device having a control electrode, and means for causing said control electrode to respond to changes in said function, said means including two opposed electro-responsive means connected to be affected by a change in said function and means causing one of said electro-responsive means to respond differently to a change in said function than the other.

FRANK W. GODSEY, Jr.